US010740759B2

(12) United States Patent
De Magalhaes et al.

(10) Patent No.: US 10,740,759 B2
(45) Date of Patent: *Aug. 11, 2020

(54) DYNAMICALLY GENERATED PAYMENT TOKEN RATINGS

(71) Applicant: International Business Machines Corporation, Armonk, NY (US)

(72) Inventors: Arthur L. De Magalhaes, Markham (CA); Nitin Gaur, Round Rock, TX (US); Wu Ning, Markham (CA); William J. O'Donnell, Fichburg, WI (US)

(73) Assignee: International Business Machines Corporation, Armonk, NY (US)

( * ) Notice: Subject to any disclaimer, the term of this patent is extended or adjusted under 35 U.S.C. 154(b) by 994 days.

This patent is subject to a terminal disclaimer.

(21) Appl. No.: 14/966,211

(22) Filed: Dec. 11, 2015

(65) Prior Publication Data

US 2017/0169430 A1    Jun. 15, 2017

(51) Int. Cl.
*G06Q 20/40*     (2012.01)
*H04W 12/12*     (2009.01)
(Continued)

(52) U.S. Cl.
CPC ....... *G06Q 20/4016* (2013.01); *G06Q 20/341* (2013.01); *G06Q 20/3672* (2013.01);
(Continued)

(58) Field of Classification Search
CPC ............ G06Q 20/4016; G06Q 20/341; G06Q 20/3672; G06Q 20/385; H04L 63/08;
(Continued)

(56) References Cited

U.S. PATENT DOCUMENTS 8,602,293 B2   12/2013  Hammad
8,763,142 B2    6/2014  McGuire et al.
(Continued)

OTHER PUBLICATIONS

Crowe et al., "Is Payment Tokenization Ready for Primetime? Perspectives from Industry Stakeholders on the Tokenization Landscape", Federal Reserve Bank of Boston, Federal Reserve Bank of Atlanta, BetterBuyDesign, Jun. 11, 2015, 51 pages (Year: 2015).*

(Continued)

*Primary Examiner* — James D Nigh
(74) *Attorney, Agent, or Firm* — Rakesh Roy

(57) ABSTRACT

According to one exemplary embodiment, a method for dynamic generation of payment token ratings is provided. The method includes receiving a token request, whereby the token request includes a plurality of metadata. The method also includes analyzing the received plurality of metadata based on at least one predefined rule set. The method further includes generating a token in response to receiving the token request. The method then includes determining an assurance rating for the generated token based on the analyzed received plurality of metadata, whereby the assurance rating indicates a risk of fraud associated with the generated token. The method finally includes assigning a token rating to the generated token based on the determined assurance rating.

11 Claims, 8 Drawing Sheets

(51) Int. Cl.
*H04L 29/06* (2006.01)
*H04W 12/06* (2009.01)
*H04W 12/10* (2009.01)
*G06Q 20/38* (2012.01)
*G06Q 20/34* (2012.01)
*G06Q 20/36* (2012.01)

(52) U.S. Cl.
CPC ........... *G06Q 20/385* (2013.01); *H04L 63/08* (2013.01); *H04L 63/105* (2013.01); *H04L 63/123* (2013.01); *H04L 63/1441* (2013.01); *H04W 12/06* (2013.01); *H04W 12/10* (2013.01); *H04W 12/12* (2013.01); *H04L 2463/082* (2013.01)

(58) Field of Classification Search
CPC . H04L 63/105; H04L 63/123; H04L 63/1441; H04L 2463/082; H04W 12/06; H04W 12/10; H04W 12/12
USPC .......................................................... 705/71
See application file for complete search history.

(56) References Cited

U.S. PATENT DOCUMENTS

| | | |
|---|---|---|
| 2012/0023567 A1 | 1/2012 | Hammad |
| 2015/0032625 A1 | 1/2015 | Dill et al. |
| 2015/0046338 A1 | 2/2015 | Laxminarayanan et al. |
| 2015/0106239 A1 | 4/2015 | Gaddam et al. |
| 2015/0120536 A1 | 4/2015 | Talker |
| 2015/0142673 A1* | 5/2015 | Nelsen ................. G06Q 20/385 705/76 |

OTHER PUBLICATIONS

EMV Payment Tokenisation—General FAQ EMV Payment Tokenisation—Payment Account Reference (PAR) FAQ EMV Payment Tokenisation—Technical FAQ, EMVCo, LLC, 2017, 16 pages (Year: 2017).*

The Evolution of Payment Specifications and Tokenization, Smart Card Alliance and EMVCo Webinar, Nov. 4, 2015, 40 pages (Year: 2015).*

Kulkarni et al., "One-Time Biometric Token based Authentication," ICVGIP'14, Dec. 14-18, 2014, 7 Pages, ACM, Bangalore, India.

Mell et al., "The NIST Definition of Cloud Computing," National Institute of Standards and Technology, Sep. 2011, p. 1-3, Special Publication 800-145.

IBM, "List of IBM Patents or Patent Applications Treated as Related (Appendix P)," Apr. 28, 2016, p. 1-2.

De Magalhaes et al., "Dynamically Generated Payment Token Ratings," Application and Drawings, Filed on Apr. 27, 2016, 32 Pages, U.S. Appl. No. 15/139,410.

* cited by examiner

DYNAMICALLY GENERATED PAYMENT TOKEN RATINGS

BACKGROUND

The present invention relates generally to the field of computing, and more particularly, to electronic payment tokens.

Payment tokenization is widely used in financial industries. Emerging mobile device payment methods offer a simple way to transform a credit card into a payment token to prevent credit card information from being stolen over electronic communications. However, payment token generation does not provide any standard methods to assign a level of confidence to the security of the token.

SUMMARY

According to one exemplary embodiment, a method for dynamic generation of payment token ratings is provided. The method includes receiving a token request, whereby the received token request includes a plurality of metadata. The method also includes analyzing the received plurality of metadata based on at least one predefined rule set. The method further includes generating a token in response to receiving the token request. The method then includes determining an assurance rating for the generated token based on the analyzed received plurality of metadata, whereby the assurance rating indicates a risk of fraud associated with the generated token. The method finally includes assigning a token rating to the generated token based on the determined assurance rating.

According to another exemplary embodiment, a computer system for dynamic generation of payment token ratings is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method includes receiving a token request, whereby the received token request includes a plurality of metadata. The method also includes analyzing the received plurality of metadata based on at least one predefined rule set. The method further includes generating a token in response to receiving the token request. The method then includes determining an assurance rating for the generated token based on the analyzed received plurality of metadata, whereby the assurance rating indicates a risk of fraud associated with the generated token. The method finally includes assigning a token rating to the generated token based on the determined assurance rating.

According to yet another exemplary embodiment, a computer program product for dynamic generation of payment token ratings is provided. The computer program product may include one or more computer-readable storage devices and program instructions stored on at least one of the one or more tangible storage devices, the program instructions executable by a processor. The computer program product includes program instructions to receive a token request, wherein the token request includes a plurality of metadata. The computer program product also includes program instructions to analyze the received plurality of metadata based on at least one predefined rule set. The computer program product further includes program instructions to generate a token in response to receiving the token request. The computer program product then includes program instructions to determine an assurance rating for the generated token based on the analyzed received plurality of metadata, wherein the assurance rating indicates a risk of fraud associated with the received token. The computer program product further includes program instructions to assign a token rating to the generated token based on the determined assurance rating.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
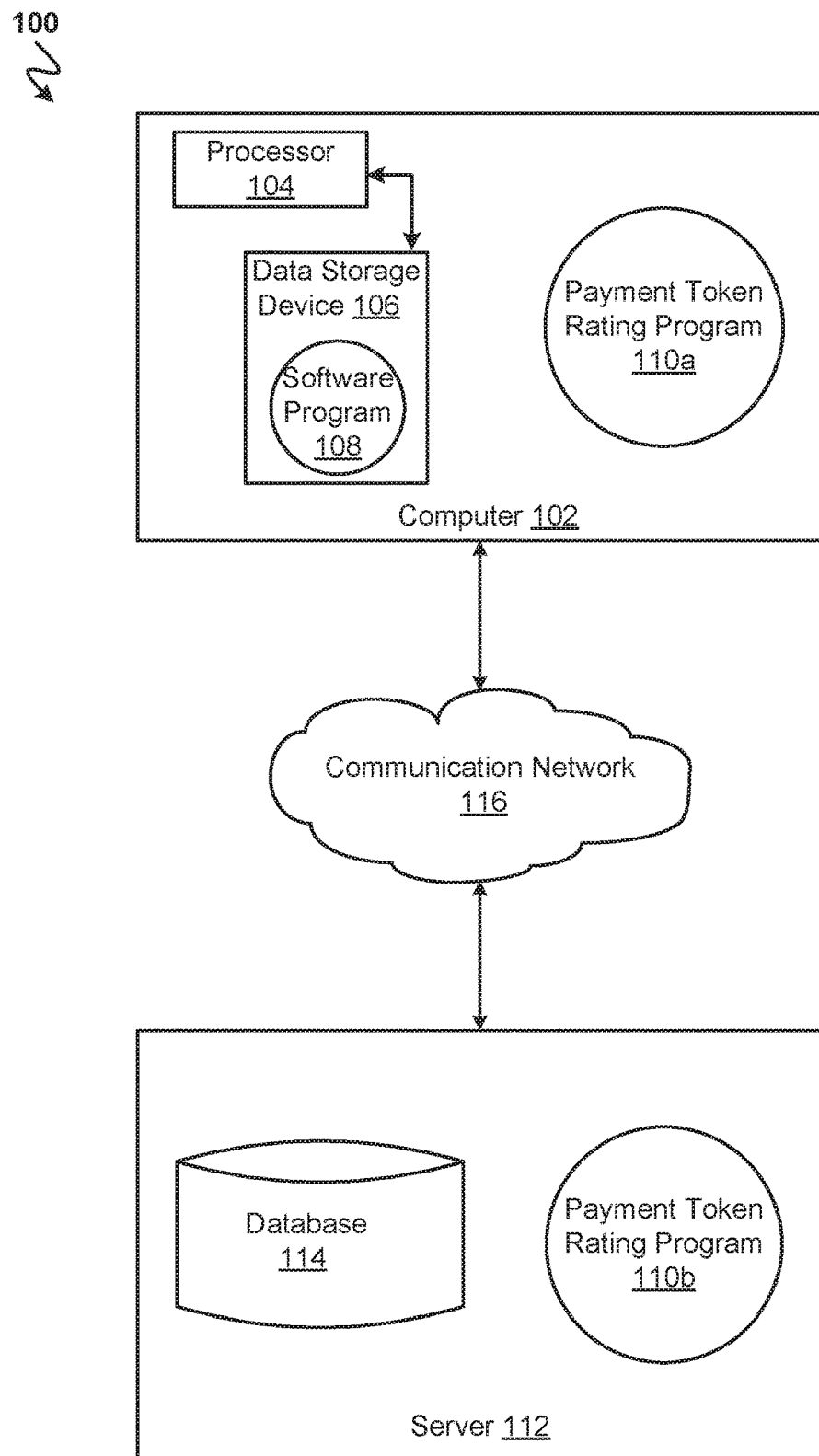
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamically generating payment token ratings. As such, the present embodiment has the capacity to improve the technical field of electronic payment tokens by defining a standardized method for rating the integrity and security of payment tokens generated for use in place of credit card numbers for electronic payment transactions. More specifically, credit card and payment token related data are analyzed and a rating is assigned to the payment token representing a level of fraud risk associated with the token.

As described previously, payment tokenization is widely used in financial industries. Emerging mobile device payment methods offer a simple way to transform a credit card into a payment token to prevent credit card information from being stolen over electronic communications. However, payment token generation does not provide any standard methods to assign a level of confidence to the security of the token.

Mobile payment systems can require the fingerprint of the electronic device's owner or a password to be used during tokenization. However, that does not identify the credit card's owner (i.e., the device's owner could be using a stolen credit card) and thus there is low confidence in the integrity of the payment token itself.

Therefore, it may be advantageous to, among other things, provide a dynamic way to determine the integrity and confidence that the payment token is not fraudulent and assign a score that reflects the determined integrity and confidence in the payment token.

According to at least one embodiment, a set of rules for distinct confidence category ratings are defined such that payment industry entities can know what different levels of assurance represent. For example, an issuer that wants to reduce the risk of payment token theft, can require an assurance level of at least 85 that will guarantee that the payment token is stored in a secured location (or some other requirement will be met that is a prerequisite for a given assurance level).

The requesting entity (e.g., a merchant for on-file purchases, a mobile phone, etc.) will request an assurance level prior to tokenization, or during a payment token update, and an independent processor will use a set of predefined rules to assign an appropriate assurance rating. Payment industry entities (e.g., merchants, issuers, acquires, processors, etc.) can require a certain level of payment token confidence for different transactions in order to minimize risk. For example, a business could define a rule that limits purchases over $100 to payment tokens that have a rating of at least 40, while enterprise-level purchases would require a rating of at least 90.

According to at least one embodiment, assurance level ratings are broken down into multiple levels, whereby the levels have a predefined rule set. For instance, a low level, a medium level, and a high level of assurance. A low level of assurance will have predefined requirements (i.e., rule set), such as pre-request authentication in the form of a $0 transaction, a credit card number validation, or card holder data validation (e.g., billing address). A medium level of assurance will have different predefined requirements (i.e., rule set), such as requiring that the primary account number (PAN) is not mapped to any existing tokens, the card data holder information field has at least two pieces of information, a card verification value (CVV) is provided, biometric authentication on the user's device initiating the electronic payment, or sensitive data must be encrypted with a 3DES algorithm. Finally, a high level of assurance will also have a different set of requirements (i.e., predefined rule set), such as a token requestor fraud risk score of at least 85, the geographic location of the request must match the location of the token requestor, the card holder's bill to/ship to addresses must match, the transaction velocity must not exceed a threshold value, the token location must map to secured storage (i.e., secure element, secure database, etc.), or the device initiating the tokenization must match the point of sale entry mode defined during payment token requestor registration.

Based on comparing the assigned token assurance level and assurance level required for the electronic payment transaction, the proposed electronic payment transaction will be approved or declined. Thus issuers or other payment entities can mitigate fraud by requiring tokens meet assurance level thresholds before approving electronic payment transactions.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a payment token rating program 110a. The networked computer environment 100 may also include a server 112 that is enabled to run a payment token rating program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the payment token rating program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the payment token rating program 110a, 110b (respectively) for rating the integrity and security of payment tokens generated for use in place of credit card numbers for electronic payment transactions. The payment token rating method is explained in more detail below with respect to FIGS. 2-5.

Figure 2:
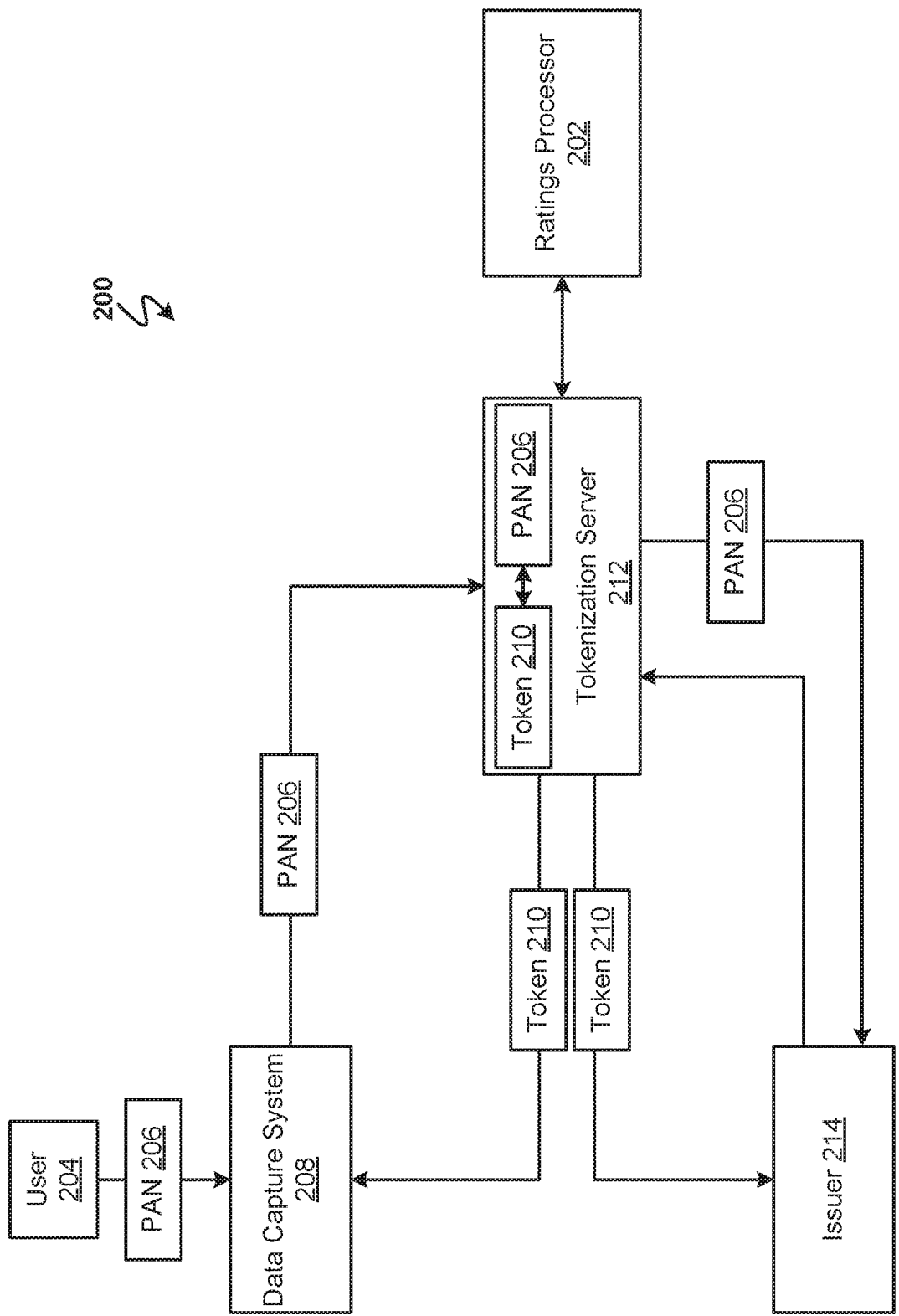
FIG. 2 is a system block diagram of a token payment system with a token ratings processor according to at least one embodiment.

Referring now to FIG. 2, a system block diagram of a token payment system 200 with a token ratings processor 202 according to at least one embodiment is depicted.

A user 204 (e.g., a person or a business) intending to make an electronic payment using the token payment system 200 will supply a primary account number (PAN) 206 to a data capture system 208 (e.g., point of sale system). The data capture system 208 will then request token 210 generation from the tokenization server 212 using the user-supplied PAN 206. The tokenization server 212 will map the PAN 206 to a token 210 that the tokenization server 212 generates. The token ratings processor 202 may then analyze metadata associated with the token request to assign an assurance level to the generated token 210, as will be described below with respect to FIGS. 3-5. The tokenization server 212 may then tag (e.g., high assurance, medium assurance, low assurance, or no assurance), or otherwise identify, the assurance level of a copy of the token 210 stored on the tokenization server 212. Thereafter, the tokenization server 212 will send the generated token 210 to the data capture system 208 for storage.

For example, an individual user 204 can utilize an electronic payment system on the user's 204 smartphone (or other electronic device, such as wearable technology) through a software application running on the smartphone, such that the smartphone can act as a data capture system 208. The software application allows the user 204 to enter a PAN 206 as a source of funds to make electronic payments. The PAN 206 will then be forwarded to the tokenization server 212 handled by a third-party which generates the token 210 and the token ratings processor 202 assigns a token rating to the generated token 210. The token ratings processor 202 associated with the tokenization server 212 will determine and assign a token rating for the token 210 based on metadata associated with the token request. The tokenization server 212 returns the token 210 to the smartphone where the token 210 is stored. The smartphone will then be able to use the token 210 instead of the more exploitable PAN 206 in making electronic payments through near field communication (NFC) or other technologies.

The issuer 214 (e.g., bank) or other payment entity (e.g., merchant, acquires, payment processors, etc.) can define required levels of token 210 assurance needed for electronic payment transactions involving the issuer 214 during payment token requestor registration completed before electronic payment transactions with tokens 210 are allowed. During payment token requestor registration, the issuer 214 will specify the required assurance level a token 210 must have to complete transactions with the issuer 214. Furthermore, the issuer 214 can specify the assurance level required for a given transaction amount (e.g., assurance level of high required for purchases over $5,000).

Once the token 210 has been stored on the data capture system 208, the user 204 will use the token 210 to attempt to make an electronic payment transaction. The tokenization server 212 may locate a copy of the token 210 and determine if the token 210 meets or exceeds the predefined assurance level threshold set by the issuer 214. If the token rating assigned to the token 210 is sufficient to complete the electronic payment transaction, the token 210 is sent to the issuer 214 and the issuer will request the PAN 206 from the tokenization server 212 and the tokenization server 212 will respond by sending the PAN 206 to the issuer 214 to complete the electronic payment transaction. If the issuer 214 has requested an assurance level that entails certain additional verification, the tokenization server 212 may send a request for the additional verification before completing the electronic payment transaction.

Figure 3:
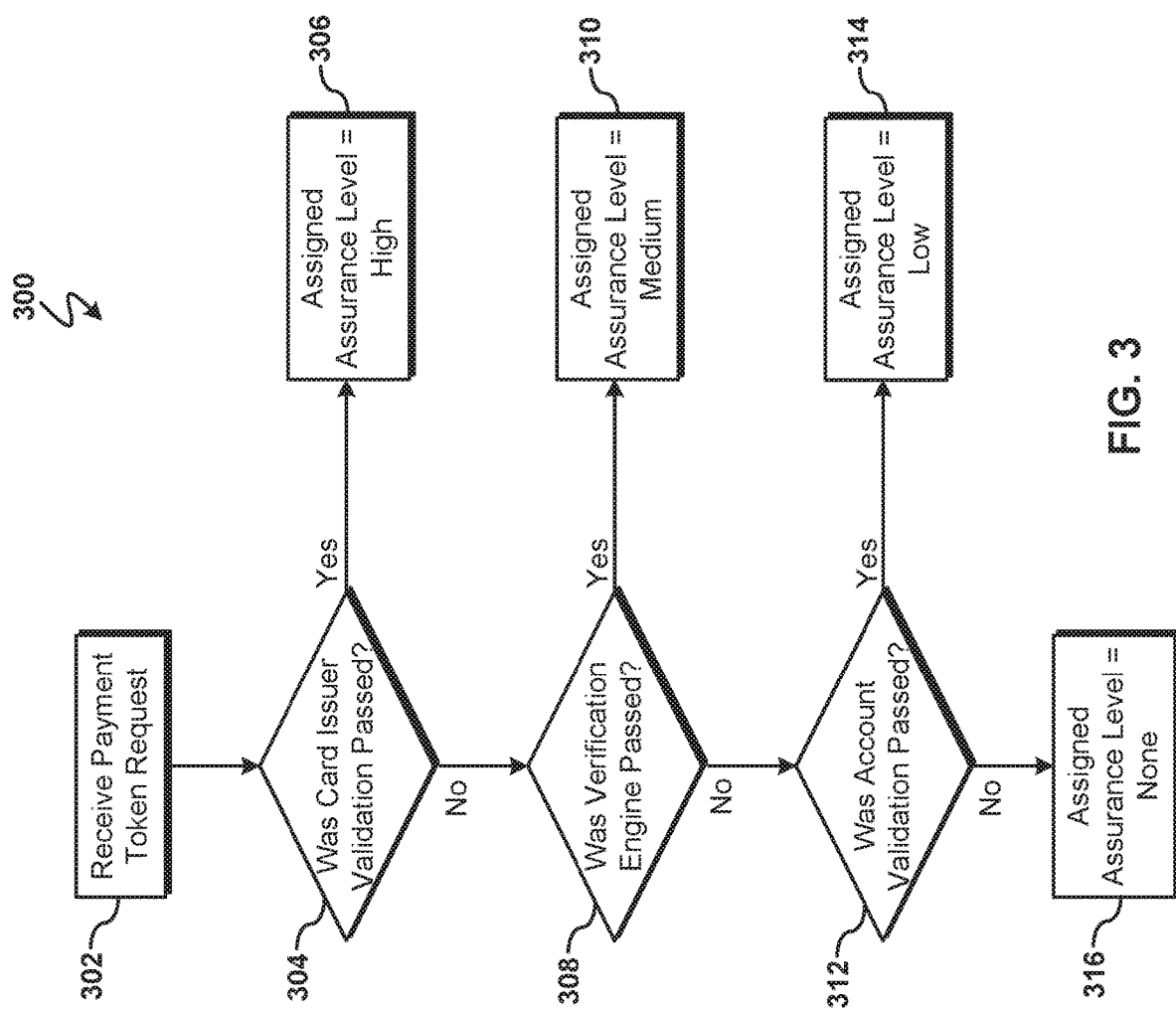
FIG. 3 is an operational flowchart illustrating a process for determining token ratings within the token ratings processor according to at least one embodiment.

Referring now to FIG. 3, an operational flowchart illustrating the exemplary token rating determination process 300 used by the payment token rating program 110a and 110b (FIG. 1) according to at least one embodiment is depicted.

At 302, a payment token request is received in the course of generating a new token 210 (FIG. 2) or updating a token 210 (FIG. 2). According to at least one embodiment, the payment token request is made by a requesting entity, such as a merchant for on-file purchases a mobile phone, etc. The payment token request is received by the tokenization server 212 (FIG. 2) where the ratings processor 202 (FIG. 2) executing the payment token rating program 110a and 110b (FIG. 1) will receive the payment token request. Additionally, metadata associated with the request is also received, such as device type (e.g., smartphone), merchant identifier, device threat/compromise index value, location where request originated, transaction velocity, etc.

Next, at 304, it is determined if metadata associated with the token request passes card issuer validation. Card issuer validation will be described in detail below with respect to FIG. 4. According to at least one embodiment, the result of the card issuer validation will be used to assign an appropriate level of assurance. Thus, passing card issuer validation at 304 results in a high assigned assurance level (e.g., 90) being associated with the token 210 (FIG. 2) at 306. With a high assurance level associated with the token 210 (FIG. 2), future electronic payment transactions requiring high assurance levels or lower can be approved using the generated token 210 (FIG. 2). Furthermore, any future determinations regarding the assurance level of the token 210 (FIG. 2) versus the assurance level required to complete a transaction will be optimized by searching tokens 210 (FIG. 2) stored in the tokenization server 212 (FIG. 2) by assigned assurance level.

If it is determined that card issuer validation was not passed at 304, the token request will be tested to determine if the token request passes a verification engine at 308. The verification engine will be described in detail below with respect to FIG. 5. According to at least one embodiment, the result of the verification engine will be used to assign an appropriate level of assurance. Thus, passing the verification engine results in a medium assigned assurance level (e.g., 60) being associated with the token 210 (FIG. 2) at 310. With a medium assurance level associated with the token 210 (FIG. 2), future electronic payment transactions requiring medium assurance levels or lower can be approved using the generated token 210 (FIG. 2). Furthermore, any future determinations regarding the assurance level of the token 210 (FIG. 2) versus the assurance level required to complete a transaction will be optimized by searching tokens 210 (FIG. 2) stored in the tokenization server 212 (FIG. 2) by assigned assurance level.

If it is determined that the verification engine was not passed at 308, the token request will be tested to determine if the token request passes account validation at 312. According to at least one embodiment, account validation can include completing a $0 transaction, credit card number validation, card holder data validation, or other validation methods using metadata associated with the token request that are defined for use in meeting a low assurance level.

The result of account validation is used to assign an appropriate level of assurance. Thus, if all account validation tests required are successfully passed, the token 210 (FIG. 2) will be assigned a low assurance level (e.g., 40) at 314. Failing account validation results in a level of none (i.e., assurance level=0) being assigned to the token 210 (FIG. 2) at 316.

Figure 4:
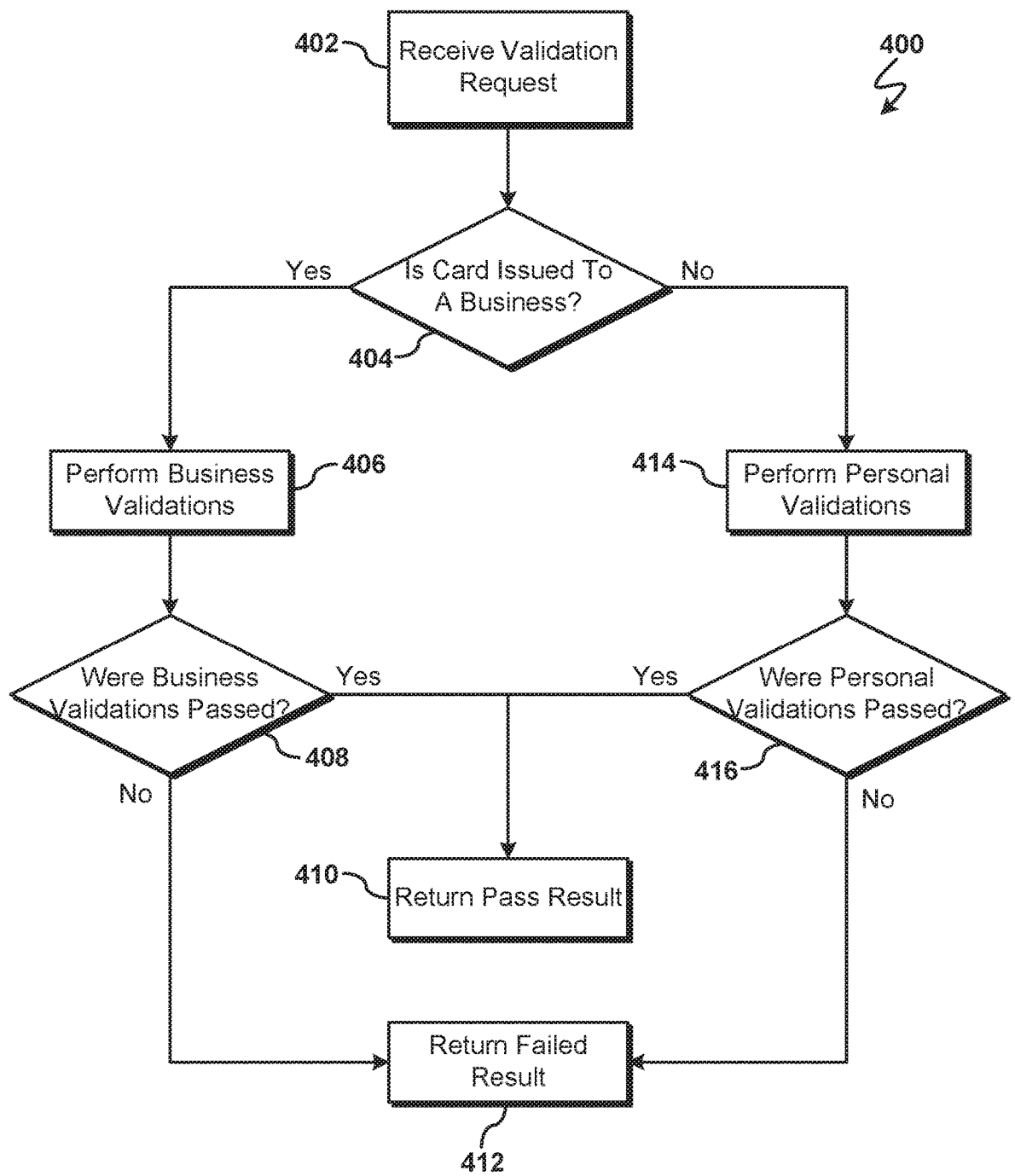
FIG. 4 is an operational flowchart illustrating a process for card issuer validation within the token ratings processor according to at least one embodiment.

Referring now to FIG. 4, an operational flowchart illustrating the exemplary card issuer validation process 400 used by the payment token rating program 110a and 110b (FIG. 1) to assign a high level of assurance according to at least one embodiment is depicted.

At 402, a validation request is received. According to at least one embodiment, the token rating determination process 300 (FIG. 3) will send a validation request to begin execution of the card issuer validation process 400. The card issuer validation process 400 will communicate with the card issuer (e.g., bank) to validate and authenticate the card holder (e.g., business or person that was issued the card).

Next, at 404, it is determined if the credit card being used for the token request received at 302 (FIG. 3) is issued to a business entity. According to at least one embodiment, credit card information is included with the metadata accompanying the token request. The credit card information within the metadata is used to determine the credit card issuer. Thereafter, the credit card issuer is queried to determine if the card is issued to a business. If the card is not issued to a business, the card can be considered to be issued to a person. According to at least one other embodiment, more than two categories of credit card holding entities (i.e., a business or a person) can be defined and queried (e.g., large corporation, small business, etc.) with a different set of tests for each category.

If it is determined that the card is issued to a business entity at 404, then a series of business validations are performed at 406. According to at least one embodiment, multiple validation tests are used to determine if the token 210 (FIG. 2) and accompanying metadata meet card issuer validation criteria. The validation tests used for determining if the token meets a high level of assurance can include a variety of tests establishing a high level of assurance against fraud in the case of a business. For example, the business validation tests can include determining the business's credit rating, determining if the business's license is valid, determining what is the purpose of the business, etc.

Next, it is determined if the business validations performed at 406 were passed at 408. According to at least one embodiment, the result of each business validation test is analyzed to determine if all business validation tests were passed. If the requisite number of business validation tests were passed (e.g., all tests), a pass result is returned at 410. If an insufficient number of business validation tests were passed (e.g., if any test was failed), a failed result will be returned at 412.

However, if it was determined that the card is not issued to a business at 404, then a series of personal validations are performed at 414. According to at least one embodiment, multiple validation tests are used to determine if the token 210 (FIG. 2) and accompanying metadata meet card issuer validation criteria. The validation tests used for determining if the token meets a high level of assurance can include a variety of tests establishing a high level of assurance against fraud in the case of an individual person. For example, the person's credit rating is queried, a two-way email confirmation is performed to verify that the person requesting the token 210 (FIG. 2) has access to the email address associated with the card and confirms the token request, etc.

Next, it is determined if the personal validations performed at 414 were passed at 416. According to at least one embodiment, the result of each personal validation test is analyzed to determine if all personal validation tests were passed. If the requisite number of personal validation tests were passed (e.g., all tests), a pass result is returned at 410. If an insufficient number of personal validation tests were passed (e.g., if any test was failed), a failed result will be returned at 412.

Figure 5:
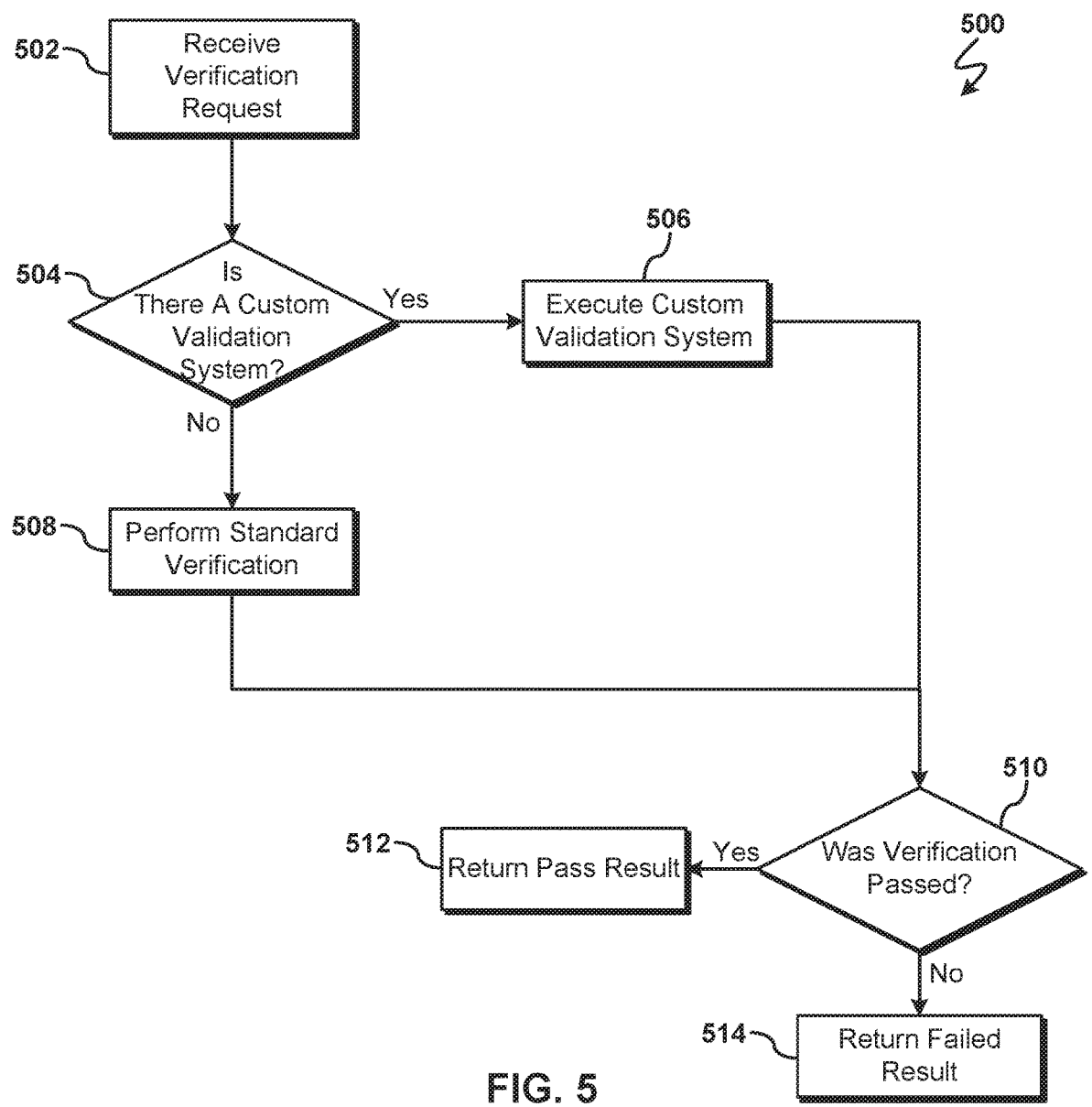
FIG. 5 is an operational flowchart illustrating a process for a verification engine within the token ratings processor according to at least one embodiment.

Referring now to FIG. 5, an operational flowchart illustrating the exemplary process for a verification engine 500 used by the payment token rating program 110a and 110b (FIG. 1) to assign a medium level of assurance according to at least one embodiment is depicted.

At 502, a verification request is received. According to at least one embodiment, the token rating determination process 300 (FIG. 3) will send a verification request to begin execution of the verification engine 500.

Next, at 504, it is determined if a custom validation system has been supplied for the verification engine 500. According to at least one embodiment, the issuer 214 (FIG. 2) or other payment entity can supply a custom validation system for the verification engine 500 to use for determining an assurance level (i.e., medium assurance level).

If it is determined that there is a custom validation system at 504, the custom validation system is executed at 506. The custom validation system includes specific tests or indicators that a payment entity requires for a given assurance level. The verification engine 500 will execute the tests or determine the indicators used by the custom validation system and store the results.

However, if it is determined that no custom validation system has been supplied at 504, then the verification engine 500 will perform the standard verification at 508. According to at least one embodiment, the standard verification includes performing various tests designed to ascertain if the token request and accompanying metadata meet thresholds for a medium level of assurance. For example, tests can include requiring that the geographic location of the token request must match the location of the token requestor, that the card holder's bill to address must match the ship to address of the proposed electronic payment, that the transaction velocity of the user 204 (FIG. 2) is below a threshold value, that the token location must map to secure storage (e.g., secure element, remote secure database, etc.), and that the device initiating the tokenization must match the point of sale (POS) entry mode defined during payment token requestor registration.

Next, it is determined if the verification performed at 508, or the custom validation system executed at 506, were successfully passed at 510. According to at least one embodiment, the result of each verification test is analyzed to determine if all verification tests were passed. If the requisite number of verification tests were passed (e.g., all tests), a pass result is returned at 512. If an insufficient number of verification tests were passed (e.g., if any test was failed), a failed result will be returned at 514.

It may be appreciated that FIGS. 2-5 provide only an illustration of one embodiment and do not imply any limitations with regard to how different embodiments may be implemented. Many modifications to the depicted embodiment(s) may be made based on design and implementation requirements. For example, the number of distinct assurance levels can be defined to be more or less than the three described above. Additionally, an issuer 214 (FIG. 2) or other entity can specify custom validation tests for multiple assurance levels (as described at 504 and 506 (FIG. 5)). Validation tests can also be defined to be cumulative, whereby a medium assurance level includes the tests from the low assurance level with additional tests, and a high assurance level will include the tests from the medium assurance level with additional tests.

Figure 6:
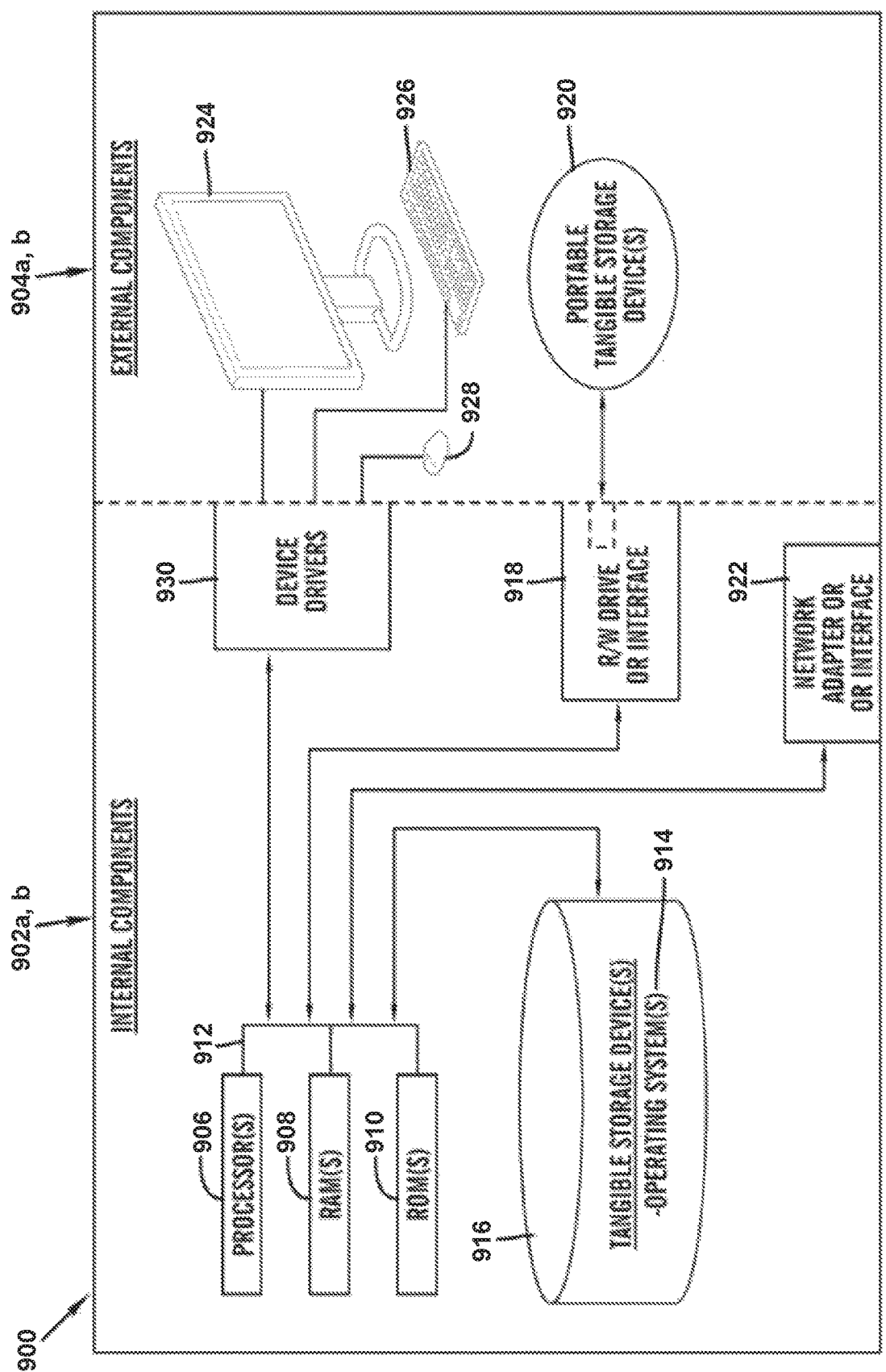
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 6. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the payment token rating program 110a (FIG. 1) in client computer 102 (FIG. 1), and the payment token rating program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the payment token rating program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the payment token rating program 110a (FIG. 1) in client computer 102 (FIG. 1) and the payment token rating program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the payment token rating program 110a (FIG. 1) in client computer 102 (FIG. 1) and the payment token rating program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
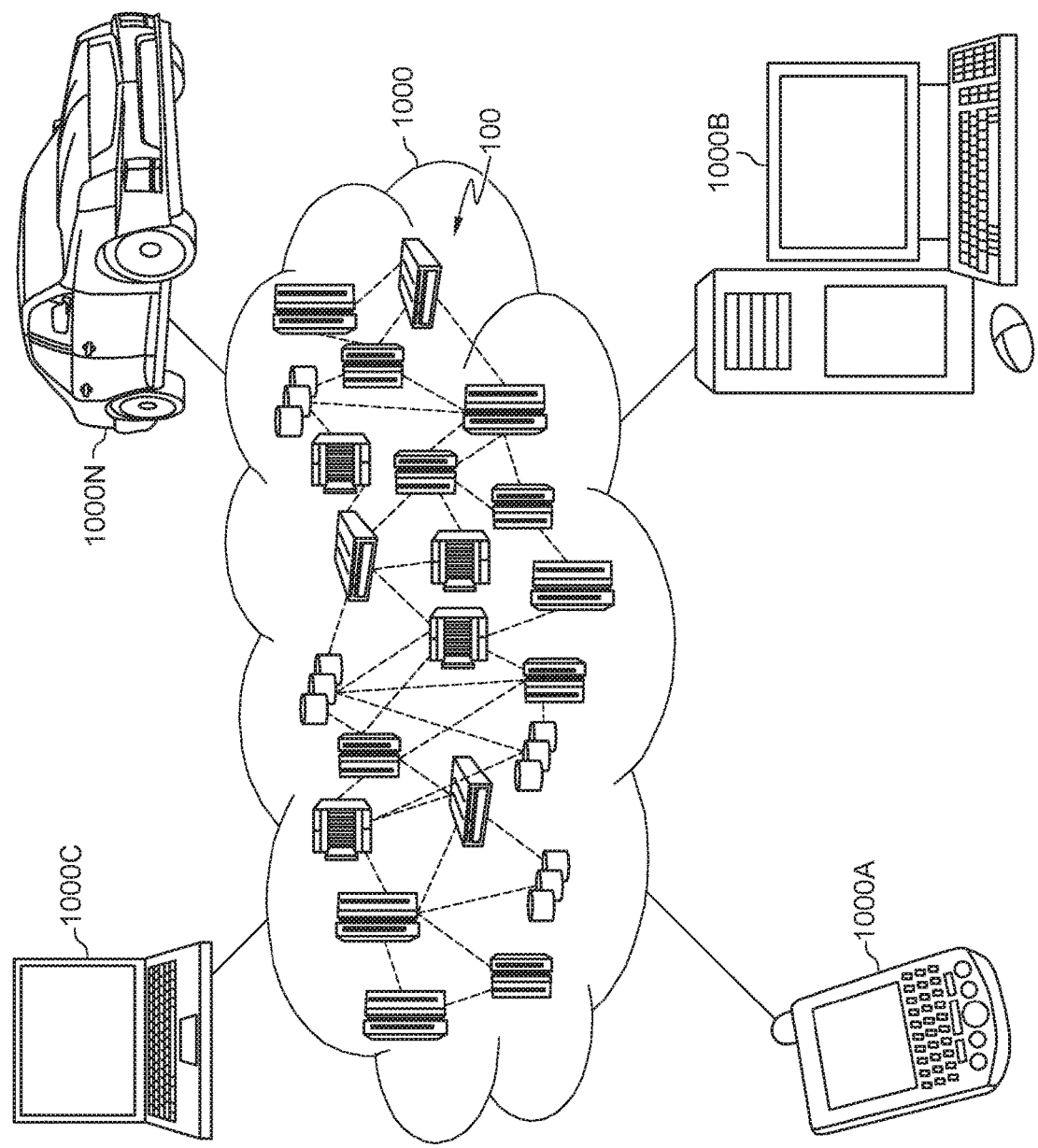
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
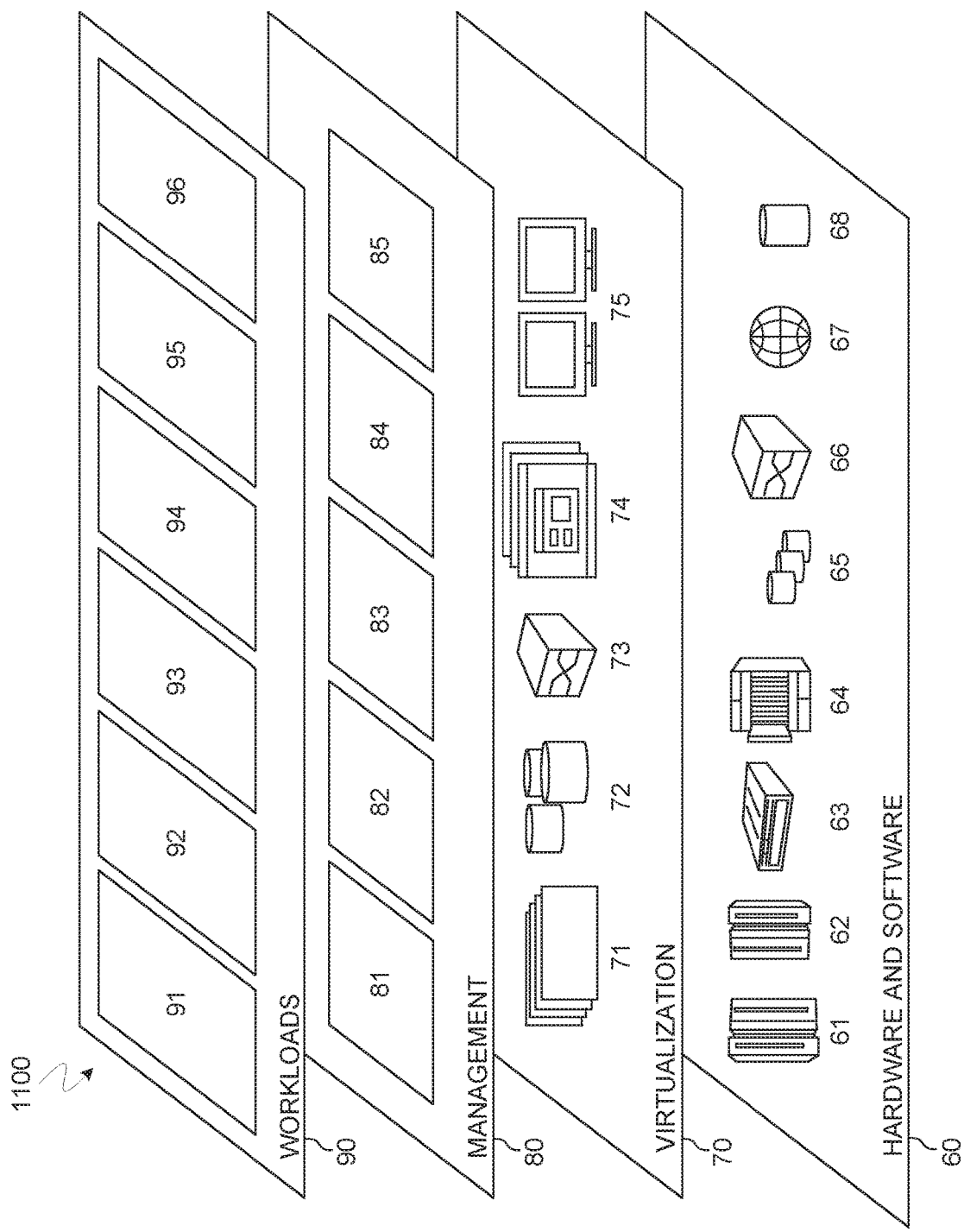
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and payment token rating 96. A payment token rating program 110a, 110b (FIG. 1) provides a way to a standardized method for rating the integrity and security of payment tokens generated for use in place of credit card numbers for electronic payment transactions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for dynamic generation of payment token ratings, comprising:
one or more servers comprising one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, at a server of the computer system, a payment token request from a data capture system of the computer system, wherein the received payment token request is responsive to the data capture system receiving a user-supplied payment source for a proposed transaction with an issuing entity and wherein the received payment token request includes a plurality of metadata;
in response to the received payment token request, generating, using the server, a payment token associated with the user-supplied payment source, wherein the generated payment token is mapped to the user-supplied payment source in the server to replace the user-supplied payment source for the proposed transaction;
defining, by the server, a plurality of standardized assurance levels for assigning to the generated payment token for the proposed transaction with the issuing entity, wherein the defined plurality of standardized assurance levels indicates, to the issuing entity, a respective security associated with a respective assurance level assigned to the generated payment token, wherein the defined plurality of standardized assurance levels includes a high assurance level indicating that a first predefined set of security requirements is met by the generated payment token, a medium assurance level indicating that a second predefined set of security requirements is met by the generated payment token, and a low assurance level indicating that a third predefined set of security requirements is met by the generated payment token;
in response to determining, using a processor of the computer system, that a card issuer validation associated with the first predefined set of security requirements is passed based on analyzing the received plurality of metadata, assigning, using the processor, the high assurance level to the generated payment token;
in response to determining, using the processor, that a verification associated with the second predefined set of security requirements is passed based on the analyzed received plurality of metadata, assigning, using the processor, the medium assurance level to the generated payment token;
in response to determining, using the processor, that an account validation associated with the third predefined set of security requirements is passed based on analyzing the received plurality of metadata, assigning, using the processor, the low assurance level to the generated payment token;
tagging, by the server, a copy of the generated payment token stored in the server with the respective assurance level assigned to the generated payment token;
transmitting, by the server, the generated payment token to the data capture system for storage;
receiving, from the issuing entity, an assurance level threshold for approving the proposed transaction;
searching the server based on the received assurance level threshold from the issuing entity; and
in response to identifying, in the server, the tagged copy of the generated payment token including the respective assurance level that satisfies the received assurance level threshold, transmitting to the issuing entity, the user-supplied payment source mapped to the generated payment token to complete the proposed transaction.

2. The computer system of claim 1, wherein the received assurance level threshold is selected from the defined plurality of assurance levels.

3. The computer system of claim 1, wherein at least one of the first predefined set of security requirements, the second predefined set of security requirements, and the third predefined set of security requirements comprises a custom rule set provided by the issuing entity.

4. The computer system of claim 1, wherein the plurality of metadata comprises at least one of a plurality of credit card data, a geographic location, a plurality of transaction data, and a plurality of validation data.

5. The computer system of claim 2, wherein the plurality of metadata comprises an issuer identifier, and wherein the issuing entity associated with the issuer identifier provides the assurance level threshold.

6. The computer system of claim 2, wherein the assurance level threshold is selected from the defined plurality of assurance levels based on at least one of a transaction amount and a transaction type.

7. A computer program product for dynamic generation of payment token ratings, comprising:
one or more computer-readable storage medium and program instructions stored on at least one of the one or more computer-readable storage medium, the program instructions executable by a processor associated with a server of a computer system to cause the processor to:
receive, at the server, a payment token request from a data capture system of the computer system, wherein the received payment token request is responsive to the data capture system receiving a user-supplied payment source for a proposed transaction and wherein the received payment token request includes a plurality of metadata;
in response to the received payment token request, transform, using the server, the user-supplied payment source into a payment token generated by the server, wherein the generated payment token is mapped to the user-supplied payment source in the server to replace the user-supplied payment source for the proposed transaction
define, by the server, a plurality of assurance levels for an issuing entity associated with the proposed transaction using the generated payment token, wherein the defined plurality of assurance levels indicates, to the issuing entity, a respective security associated with a respective assurance level assigned to the generated payment token, wherein the defined plurality of assurance levels includes a high assurance level indicating that a first predefined set of security requirements is met by the generated payment token, a medium assurance level indicating that a second predefined set of security requirements is met by the generated payment token, and a low assurance level indicating that a third predefined set of security requirements is met by the generated payment token;

in response to determining, using a processor of the computer system, that a card issuer validation associated with the first predefined set of security requirements is passed based on analyzing the received plurality of metadata, assign, using the processor, the high assurance level to the generated payment token;

in response to determining, using the processor, that a verification associated with the second predefined set of security requirements is passed based on analyzing the received plurality of metadata, assign, using the processor, the medium assurance level to the generated payment token;

in response to determining, using the processor, that an account validation associated with the third predefined set of security requirements is passed based on analyzing the received plurality of metadata, assign, using the processor, the low assurance level to the generated payment token;

tagging, by the server, a copy of the generated payment token stored in the server with the respective assurance level assigned to the generated payment token;

transmitting, by the server, the generated payment token to the data capture system for storage;

receiving, from the issuing entity, an assurance level threshold for approving the proposed transaction;

searching the server based on the received assurance level threshold from the issuing entity; and in response to identifying, in the server, the tagged copy of the generated payment token including the respective assurance level that satisfies the received assurance level threshold, transmitting to the issuing entity, the user-supplied payment source mapped to the generated payment token to complete the proposed transaction.

8. The computer program product of claim 7, wherein the received assurance level threshold is selected from the defined plurality of assurance levels.

9. The computer program product of claim 7, wherein at least one of the first predefined set of security requirements, the second predefined set of security requirements, and the third predefined set of security requirements comprises a custom rule set provided by the issuing entity.

10. The computer program product of claim 7, wherein the plurality of metadata comprises at least one of a plurality of credit card data, a geographic location, a plurality of transaction data, and a plurality of validation data.

11. The computer program product of claim 8, wherein the plurality of metadata comprises an issuer identifier, and wherein the issuing entity associated with the issuer identifier provides the assurance level threshold.

* * * * *